(No Model.)
T. W. WELSH.
PIPE COUPLING.
No. 458,542. Patented Aug. 25, 1891.
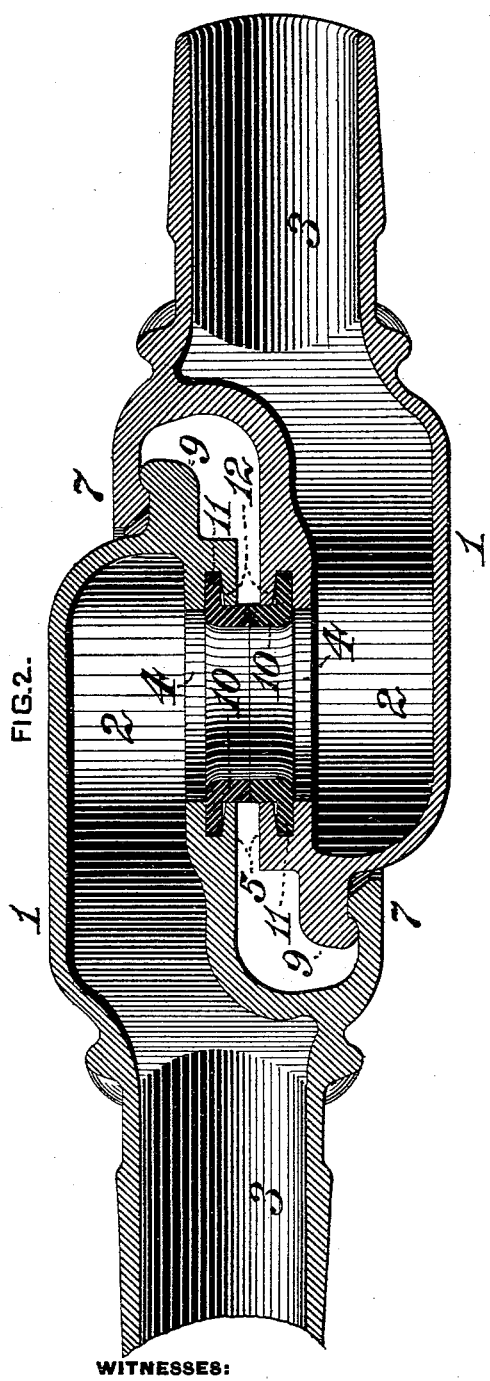
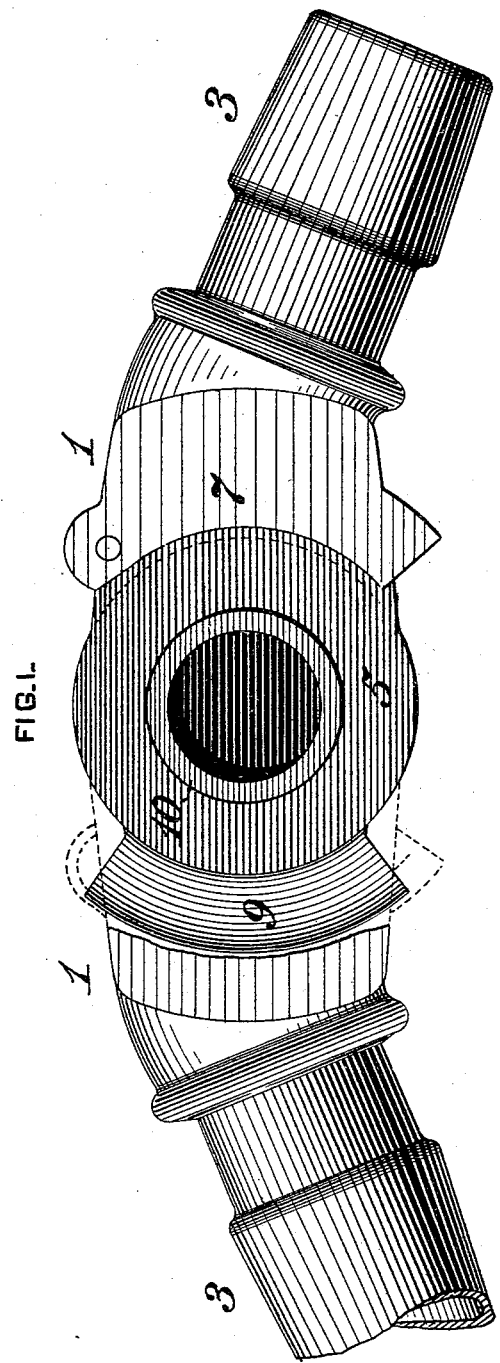
WITNESSES:
E. Newell.
F. E. Gaither.
INVENTOR,
Thomas W. Welsh,
by J. Snowden Bell, Att'y.

UNITED STATES PATENT OFFICE.

THOMAS W. WELSH, OF WILMERDING, ASSIGNOR TO THE WESTINGHOUSE AIR BRAKE COMPANY, OF PITTSBURG, PENNSYLVANIA.

PIPE-COUPLING.

SPECIFICATION forming part of Letters Patent No. 458,542, dated August 25, 1891.

Application filed April 11, 1891. Serial No. 388,515. (No model.)

*To all whom it may concern:*

Be it known that I, THOMAS W. WELSH, a citizen of the United States, residing at Wilmerding, in the county of Allegheny and State of Pennsylvania, have invented or discovered a certain new and useful Improvement in Pipe-Couplings, of which improvement the following is a specification.

My invention relates to detachable couplings for pipes or hose of the class or type in which two counterpart coupling-sections or half-couplings are held in connection and a tight joint maintained between them by the engagement of a hook or curved flange upon each section, with a counter hook or groove upon the other.

The object of my invention is to simplify and economize the construction of couplings of such character by the provision of means whereby the gaskets or packing-rings which abut to make the joint may be readily and securely inserted and maintained in position without the employment of the accessory fastening devices heretofore required for such purpose.

To this end my invention, generally stated, consists in the combination of a coupling-section having an opening in its face for the passage of fluid and a packing-ring fitting in said opening and having a circumferential flange fitting in a tapered groove formed in the coupling-section around said opening.

The improvement claimed is hereinafter fully set forth.

In the accompanying drawings, Figure 1 is a plan view of one of the halves or sections of a pipe-coupling embodying my invention, and Fig. 2 a longitudinal section through the same at the line $x\ x$ of Fig. 1.

In the practice of my invention I provide two hollow or chambered coupling-sections 1, which are shown in this instance as of the standard Westinghouse type, and are therefore counterparts one of the other. Each section is provided with a hook or curved flange 9 and a counter hook, catch, or grooved projection 7, which are arranged on opposite sides of an opening 4 in the face 5 of the section for the passage of fluid to or from the chamber 2 of the coupling-section, the sections being connected by their hooks and counter-hooks in a manner well known in the art. The sections are connected to their respective lines of pipe or hose by tubular extensions 3, which communicate freely with the interior of the sections and the fluid-openings 4.

In order to make and maintain an absolutely tight joint between the two sections of the coupling, their fluid-openings have been provided with packing-rings or gaskets of rubber or analogous material adapted to be brought into close contact under pressure induced in and by the connection of the coupling-sections. The special appliances heretofore employed for enabling the packing-rings to be inserted and held in their normal positions in the coupling-sections involve the objection of a certain degree of structural complication and expense, which my improvement is designed to obviate without in anywise impairing the function of the packing-rings as the abutting members of a continuous fluid-way in a connected coupling. To this end I provide each coupling-section with a packing-ring or gasket 10, of rubber or similar material, which is of substantially cylindrical form and has one of its ends turned outwardly, so as to form a circumferential flange 11. An incline-sided groove or recess 12 is formed in the wall of the fluid-opening 4, the depth of said groove being sufficient to receive the flange 11, which is sprung or forced thereinto, the cylindrical body of the packing-ring fitting closely in the fluid-opening 4 above said groove, with its opposite end—that is to say, its abutting face—projecting a short distance above the face 5 of the coupling-section. The groove 12 being formed of outwardly-tapering section, or, in other words, increasing in width from its bottom toward the opening 4, the flange 11 can be wedged into and held firmly in the groove. The outer diameter of the body 10 of the ring is substantially equal to or only slightly greater than the diameter of the opening 4, so that the inner end of the body does not abut against the metal of the coupling-section and is exposed to the fluid-pressure therein. The ring of each section is thereby permitted to yield slightly by a limited degree of inward movement of its body when brought into contact with that of the ring of the other section, thus permitting the connection and disconnection of the sections, as required, while enabling the requisite longitudinal pressure to be exerted upon the bodies of the rings for effecting and maintaining the close contact of their abutting ends or faces when the coupling-sections are connected.

It will be seen that the packing-rings can be readily inserted without requiring a special tool or a skilled operator and that they will be held securely in position by the engagement of the flanges 11 and grooves 12. Further, there is no tendency to their displacement in connecting the sections, inasmuch as the application of pressure tends to force the flanges more closely into the grooves.

The economy and advantage attained by dispensing with the supplemental fastening devices heretofore employed will be obvious on inspection to those familiar with fluid-pressure brake construction, for application in which my improvement is specially designed.

I claim as my invention and desire to secure by Letters Patent—

1. The combination, in a detachable pipe-coupling, of a coupling-section having an opening in its face for the passage of fluid, and a cylindrical packing-ring fitting in said opening and having its axis coincident with the axis thereof and having a circumferential flange substantially at right angles to the cylindrical portion at its inner end fitting in a tapered groove formed in the metal of the coupling-section surrounding said opening, substantially as set forth.

2. The combination, in a detachable pipe-coupling, of a coupling-section provided with an opening in its face for the passage of fluid, and a cylindrical packing-ring fitting in said opening and having the inner end of its body clear of or out of contact with the metal surrounding the same and provided with a circumferential flange substantially at right angles to the cylindrical portion and fitting in a tapered groove formed in the wall of the opening, substantially as set forth.

In testimony whereof I have hereunto set my hand.

THOMAS W. WELSH.

Witnesses:
JOSEPH WINGERSON,
JOHN F. MILLER.